(12) United States Patent
Liao et al.

(10) Patent No.: US 9,645,480 B2
(45) Date of Patent: May 9, 2017

(54) LIGHT SOURCE MODULE AND PROJECTION APPARATUS HAVING THE SAME

(71) Applicants: Chien-Chung Liao, Hsin-Chu (TW);
Yin-Cheng Lin, Hsin-Chu (TW)

(72) Inventors: Chien-Chung Liao, Hsin-Chu (TW);
Yin-Cheng Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 61 days.

(21) Appl. No.: 14/670,416

(22) Filed: Mar. 27, 2015

(65) Prior Publication Data

US 2015/0362830 A1    Dec. 17, 2015

(30) Foreign Application Priority Data

Jun. 13, 2014    (TW) .............................. 103120570 A

(51) Int. Cl.
*G03B 21/20*    (2006.01)
*G03B 33/08*    (2006.01)

(52) U.S. Cl.
CPC ....... *G03B 21/204* (2013.01); *G03B 21/2066* (2013.01); *G03B 33/08* (2013.01)

(58) Field of Classification Search
CPC .................................................. G03B 21/204
See application file for complete search history.

(56) References Cited

U.S. PATENT DOCUMENTS 8,469,520 B2 *   6/2013   Maeda ............... G03B 21/2033
                                                            349/9
8,911,092 B2 *  12/2014   Fujita ................... G03B 21/204
                                                            353/31
(Continued)

FOREIGN PATENT DOCUMENTS

CN        101937161 A       1/2011
CN        102213383         10/2011
(Continued)

OTHER PUBLICATIONS

"Office Action of Taiwan Counterpart Application", issued on Apr. 10, 2015, p. 1-p. 3.
(Continued)

*Primary Examiner* — Bao-Luan Le
(74) *Attorney, Agent, or Firm* — Jianq Chyun IP Office

(57) ABSTRACT

A light source module includes a light source, a wavelength conversion module, and a light combining unit. The light source provides a beam. The wavelength conversion module converts part of the beam into a wavelength conversion beam and reflects part of the beam. The light combining unit is disposed between the light source and the wavelength conversion module and located on transmission paths of the beam and the wavelength conversion beam, and includes a splitting portion and a wavelength reflecting portion. The beam is transmitted to the wavelength conversion module after passing through the splitting portion. The splitting portion reflects the wavelength conversion beam. Part of the beam is transmitted to the wavelength reflecting portion after reflected by the wavelength conversion module. The wavelength reflecting portion reflects part of the beam to combine the beam and the wavelength conversion beam into an illumination beam. A projection apparatus is also provided.

24 Claims, 4 Drawing Sheets

(56) References Cited

U.S. PATENT DOCUMENTS

| | | | |
|---|---|---|---|
| 9,151,471 B2* | 10/2015 | Ogura | F21V 13/08 |
| 9,229,301 B2* | 1/2016 | Huang | G03B 21/142 |
| 2010/0328632 A1* | 12/2010 | Kurosaki | G03B 21/204 |
| | | | 353/98 |
| 2011/0310353 A1* | 12/2011 | Maeda | G03B 21/2033 |
| | | | 353/31 |
| 2013/0021582 A1* | 1/2013 | Fujita | G03B 21/204 |
| | | | 353/31 |
| 2013/0250253 A1* | 9/2013 | Ogura | F21V 13/08 |
| | | | 353/85 |
| 2013/0314671 A1 | 11/2013 | Tseng | |
| 2013/0322056 A1* | 12/2013 | Konuma | F21V 13/14 |
| | | | 362/84 |
| 2014/0285774 A1* | 9/2014 | Tajiri | G03B 21/28 |
| | | | 353/38 |
| 2015/0153636 A1* | 6/2015 | Hartwig | G03B 21/204 |
| | | | 353/31 |
| 2015/0177599 A1* | 6/2015 | Huang | G03B 21/142 |
| | | | 353/31 |

FOREIGN PATENT DOCUMENTS

| | | |
|---|---|---|
| CN | 102650809 A | 8/2012 |
| CN | 102854729 A | 1/2013 |
| CN | 102890398 A | 1/2013 |
| CN | 103062672 A | 4/2013 |
| CN | 103207507 A | 7/2013 |
| CN | 103324015 A | 9/2013 |
| JP | 2011128521 | 6/2011 |
| JP | 2011209555 | 10/2011 |
| TW | 580545 | 3/2004 |
| TW | 200408784 | 6/2004 |
| TW | M423266 | 2/2012 |
| TW | M436167 | 8/2012 |

OTHER PUBLICATIONS

"Office Action of China Counterpart Application", issued on Aug. 12, 2016, p. 1-p. 12.

* cited by examiner

LIGHT SOURCE MODULE AND PROJECTION APPARATUS HAVING THE SAME

CROSS-REFERENCE TO RELATED APPLICATION

This application claims the priority benefit of Taiwan application serial no. 103120570, filed on Jun. 13, 2014. The entirety of the above-mentioned patent application is hereby incorporated by reference herein and made a part of this specification.

BACKGROUND

Technical Field

The invention relates to an optical module and an optical apparatus, and particularly relates to a light source module and a projection apparatus.

Related Art

Recently, projection apparatus applying a solid state light source such as light-emitting diode (LED) and laser diode gradually becomes popular in the market. Since the laser diode has a lighting efficiency of 20% higher, in order to break through the light source limitation of the LED, a technique of using the laser light source to excite the fluorescent powder to generate a pure color light source required by the projector is gradually developed. Moreover, besides that the laser projection apparatus can use the laser light source to excite the fluorescent powder to emit light, the laser projection apparatus can also directly take the laser light source as an illumination light source of the projector, and has an advantage of adjusting the number of the light sources in response to a brightness requirement, so as to meet different brightness requirements of the projector. Therefore, the laser light source serving as a light source module of the projector has a great potential to replace the conventional high pressure mercury lamp to become the light source of the projectors of a new generation.

However, under a current structure of the laser projection apparatus, the laser light source has to penetrate through a fluorescent powder wheel, and an optical element such as a field lens or a reflection mirror is used to loop a transmission path of a beam provided by the laser light source, such that the beam provided by the laser light source can be coupled into an integration rod to mix with a beam converted by the fluorescent powder wheel. In this way, the optical element configured for looping the transmission path of the beam provided by the laser light source results in a fact that a volume of the laser projection apparatus is not easy to be reduced.

Taiwan patent publication No. 580545 discloses a multi-light source illumination system. Taiwan utility model patent No. M436167 discloses a bonding prism. U.S. patent publication No. 2013314671 discloses a projector.

The information disclosed in this BACKGROUND section is only for enhancement of understanding of the BACKGROUND of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The invention is directed to a light source module, which has an advantage of small volume.

The invention is directed to a projection apparatus, which has an advantage of small volume.

Other objects and advantages of the invention can be further illustrated by the technical features broadly embodied and described as follows.

In order to achieve one or a portion of or all of the objects or other objects, an embodiment of the invention provides a light source module including a light source, a wavelength conversion module, and a light combining unit. The light source is configured to provide a beam. The wavelength conversion module is configured to convert a part of the beam into a wavelength conversion beam and reflect a part of the beam. The light combining unit is disposed between the light source and the wavelength conversion module and is located on transmission paths of the beam and the wavelength conversion beam. The light combining unit includes a splitting portion and a wavelength reflecting portion. The beam emitted by the light source is transmitted to the wavelength conversion module after passing through the splitting portion. The splitting portion reflects the wavelength conversion beam transmitted to the splitting portion. A part of the beam is transmitted to the wavelength reflecting portion after being reflected by the wavelength conversion module. The wavelength reflecting portion reflects a part of the beam, such that the part of the beam and the wavelength conversion beam are combined to form an illumination beam.

In order to achieve one or a portion of or all of the objects or other objects, an embodiment of the invention provides a projection apparatus including the aforementioned light source module, a light valve and a projection lens. The light valve is disposed on a transmission path of the illumination beam, and is configured to convert the illumination beam into an image beam. The projection lens is disposed on a transmission path of the image beam.

In an embodiment of the invention, the light combining unit has two surfaces opposite to each other, and the splitting portion and the wavelength reflecting portion are respectively located on the two surfaces.

In an embodiment of the invention, the beam includes a first sub beam and a second sub beam. Wavelengths of the first sub beam and the second sub beam are different, and the wavelength reflecting portion includes a first wavelength reflecting portion and a second wavelength reflecting portion. The first wavelength reflecting portion is pervious to the second sub beam and reflects the first sub beam. The second wavelength reflecting portion is pervious to the first sub beam and reflects the second sub beam. A part of the first sub beam passing through the second wavelength reflecting portion is transmitted to the first wavelength reflecting portion after reflected by the wavelength conversion module, and a part of the second sub beam passing through the first wavelength reflecting portion is transmitted to the second wavelength reflecting portion after reflected by the wavelength conversion module.

In an embodiment of the invention, the light combining unit has two surfaces opposite to each other, and the splitting portion and the wavelength reflecting portion are located on one of the two surfaces.

In an embodiment of the invention, the wavelength conversion module includes a reflecting portion and at least one wavelength conversion portion. The reflecting portion and the at least one wavelength conversion portion are cut into the transmission path of the beam in turn. A part of the beam is converted into the wavelength conversion beam by the at least one wavelength conversion portion when the wavelength conversion portion is cut into the transmission path of the beam, and the beam is reflected by the reflecting portion when the reflecting portion is cut into the transmission path of the beam.

In an embodiment of the invention, the at least one wavelength conversion portion has a plurality of wavelength conversion portions, and the wavelength conversion portions are cut into the transmission path of the beam in turn, and colors of the wavelength conversion beams by the wavelength conversion portions respectively converting and reflecting the beam are at least partially different.

In an embodiment of the invention, the wavelength conversion module includes a passing through portion, at least one wavelength conversion portion and a reflecting unit. The passing through portion and the at least one wavelength conversion portion are cut into the transmission path of the beam in turn, and a part of the beam is converted into the wavelength conversion beam by the at least one wavelength conversion portion when the wavelength conversion portion is cut into the transmission path of the beam. When the passing through portion is cut into the transmission path of the beam, the beam passes through the passing through portion, and is reflected by the reflecting unit and transmitted to the light combining unit.

In an embodiment of the invention, the at least one wavelength conversion portion has a plurality of wavelength conversion portions, and the wavelength conversion portions are cut into the transmission path of the beam in turn, and colors of the wavelength conversion beams by the wavelength conversion portions respectively converting and reflecting the beam are at least partially different.

In an embodiment of the invention, the light source module further includes a light transmitting module, where the beam is incident to the wavelength conversion module through the light transmitting module, and a part of the beam is transmitted to the wavelength reflecting portion through the light transmitting module after the part of the beam is reflected by the wavelength conversion module.

In an embodiment of the invention, the beam is incident to the wavelength conversion module through the light transmitting module by an angle, and the angle ranges between 0 degree and 55 degree.

In an embodiment of the invention, the light combining unit has a normal line, the light transmitting module has an optical axis, an included angle is formed between the normal line and the optical axis, and the included angle ranges between 40 degree and 50 degree.

In an embodiment of the invention, the light source is a laser exciting light source, and the beam is a laser exciting beam.

According to the above descriptions, the embodiment of the invention has at least one of the following advantages or effects. In the light source module and the projection apparatus of the invention, by configuring the splitting portion and the wavelength reflecting portion, a part of beam reflected by the wavelength conversion module and the wavelength conversion beams are combined into the illumination beam by the light combining unit. Therefore, there is no additionally designing other optical elements or beam transmission paths required, so as to reduce a volume of the whole optical path.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The present invention will now be described more fully with reference to the accompanying drawings, in which exemplary embodiments of the invention are shown. The terms used herein such as "above," "below," "front," "back," "left" and "right" are for the purpose of describing directions in the figures only and are not intended to be limiting of the invention.

Figure 1:
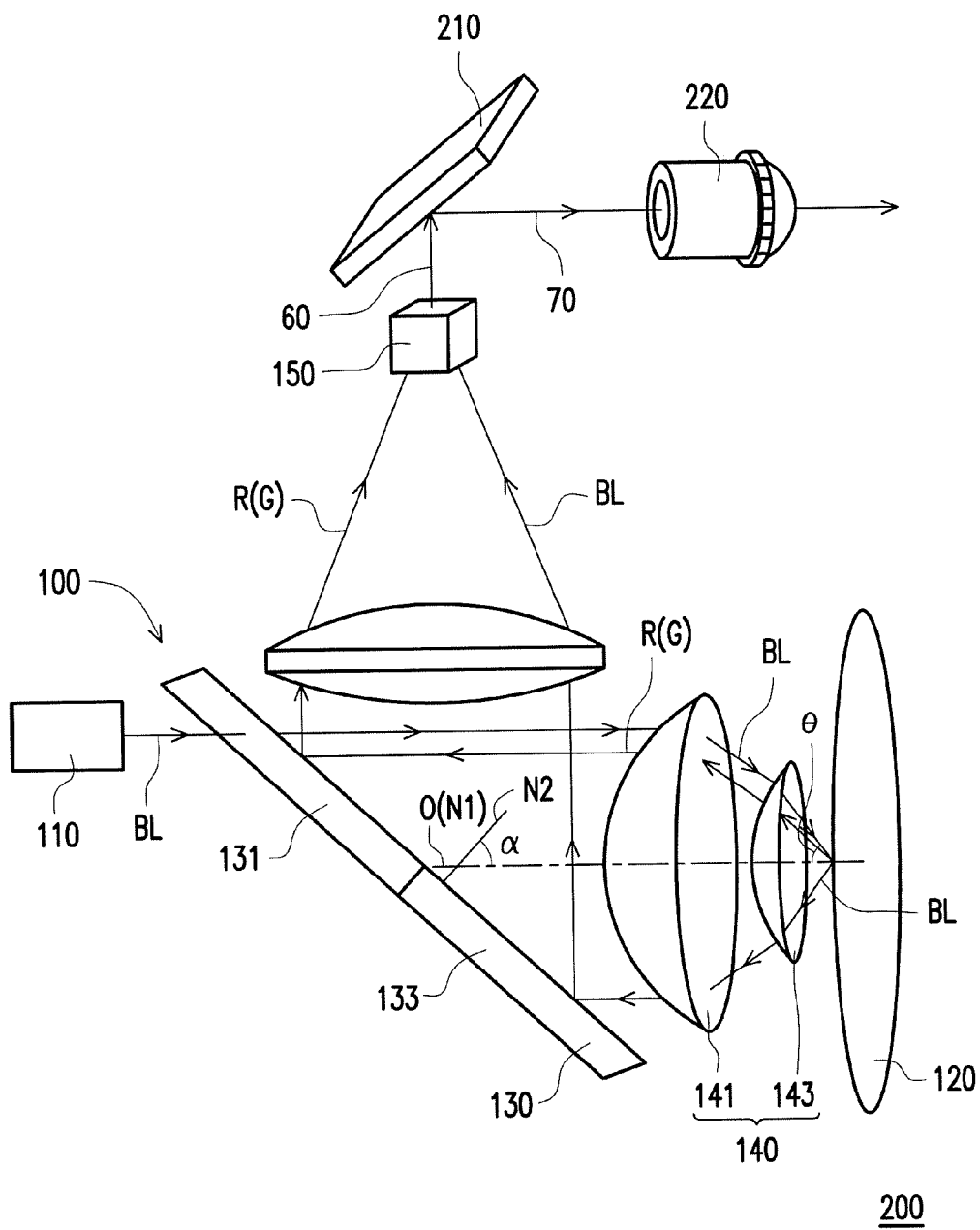
FIG. 1 is a three-dimensional view of a projection apparatus according to an embodiment of the invention.

FIG. 1 is a three-dimensional view of a projection apparatus according to an embodiment of the invention. Referring to FIG. 1, the projection apparatus 200 of the present embodiment includes a light source module 100, a light valve 210 and a projection lens 220. In detail, in the present embodiment, the light source module 100 is configured to provide an illumination beam 60. The light valve 210 is disposed on a transmission path of the illumination beam 60, and is configured to convert the illumination beam 60 into an image beam 70. In the present embodiment, the light valve 210 is, for example, a digital micro-mirror device (DMD) or a liquid-crystal-on-silicon panel (LCOS panel). However, in other embodiment, the light valve 210 can also be a transmissive liquid crystal panel or other spatial light modulator. The projection lens 220 is disposed on a transmission path of the image beam 70, and is configured to project the image beam 70 onto a screen (not shown) to form an image frame.

Further, in the present embodiment, the light source module 100 includes a light source 110, a wavelength conversion module 120, a light combining unit 130 and an integration rod 150. The light source 110 is configured to provide a beam BL. In the present embodiment, the light source 110 is a laser exciting light source, and the beam BL is a laser exciting beam. For example, the light source 110 is a blue-ray laser diode, the beam BL is a blue-ray laser beam, and the wavelength conversion module 120 is, for example, a wavelength conversion wheel or a fluorescent powder wheel, though the invention is not limited thereto. In other embodiment, the light source 110 is, for example, a blue-ray diode, the beam BL is a blue-ray beam, and the wavelength conversion module 120 is a filter module or a color wheel.

Figure 2A:
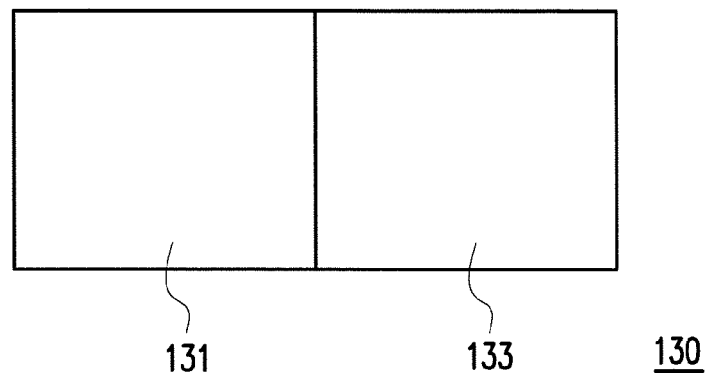
FIG. 2A is a front view of a light combining unit of FIG. 1.

FIG. 2A is a front view of a light combining unit of FIG. 1. In the present embodiment, the light combining unit 130 is disposed on the transmission path of the beam BL, and is located between the light source 110 and the wavelength conversion module 120. In detail, the light combining unit 130 is a dichroic mirror or a dichroic mirror set, which has a plurality of different effective regions for providing different optical effects to the beams of different wavelengths, correspondingly. For example, as shown in FIG. 1 and FIG. 2A, the light combining unit 130 includes a splitting portion 131 and a wavelength reflecting portion 133, where the splitting portion 131 is, for example, pervious to the blue-ray beam, and reflects beams with other wavelengths (for example, a red beam, a green beam, a yellow beam, etc.), and the wavelength reflecting portion 133 reflects the blue-ray beam, and is pervious to the beams with other wavelengths (for example, the red beam, the green beam, the yellow beam, etc.).

In other words, the splitting portion 131 of the light combining unit 130 is pervious to the beam BL. In this way, as shown in FIG. 1, the beam BL passes through the light combining unit 130 and is incident to the wavelength conversion module 120. On the other hand, as shown in FIG. 1, in the present embodiment, the light source module 100 further includes a light transmitting module 140, where the beam BL is incident to the wavelength conversion module 120 through the light transmitting module 140. In detail, in the present embodiment, the light transmitting module 140 may include a plurality of concave-convex lenses 141 and 143, where concave surfaces of the concave-convex lenses 141 and 143 face the wavelength conversion module 120, and convex surfaces thereof face the light combining unit 130. For example, in the present embodiment, a radius of curvature of the concave surface of the concave-convex lens 141 is 60 mm, a radius of curvature of the convex surface thereof is 10 mm; a radius of curvature of the concave surface of the concave-convex lens 143 is 40 mm, and a radius of curvature of the convex surface thereof is 7 mm. In this way, by using the concave-convex lenses 141 and 143 with suitable dioptres, the beam BL can be incident to the wavelength conversion module 120 through the light transmitting module 140 by an angle $\theta$, where the angle $\theta$ ranges from 0 degree to 55 degree, and the angle $\theta$ is defined as an included angle between a normal direction N1 of the wavelength conversion module 120 and the beam BL. It should be noticed that the aforementioned value range is only used as an example, and the invention is not limited thereto.

Figure 2B:
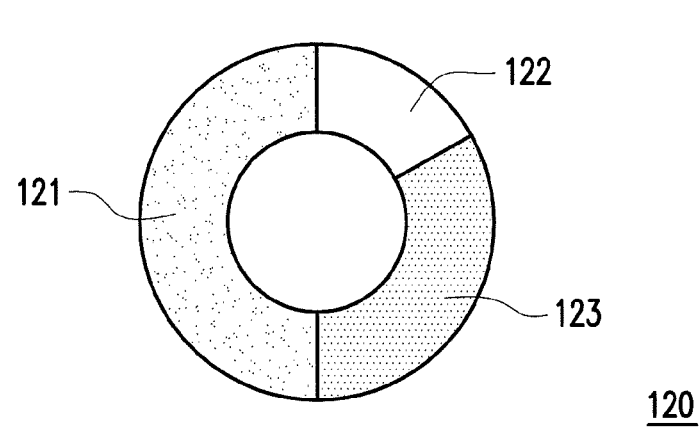
FIG. 2B is a front view of a wavelength conversion module of FIG. 1.
Figure 2C:
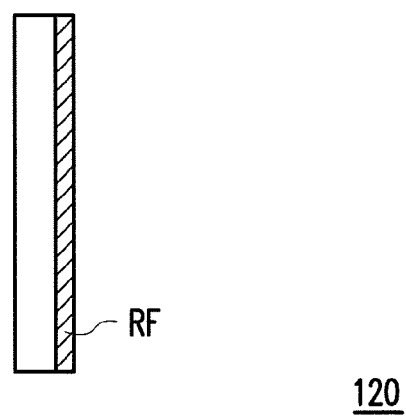
FIG. 2C is a side view of the wavelength conversion module of FIG. 2B.

FIG. 2B is a front view of a wavelength conversion module of FIG. 1, and FIG. 2C is a side view of the wavelength conversion module of FIG. 2B. Referring to FIG. 2B and FIG. 2C, in the present embodiment, the wavelength conversion module 120 includes a reflecting portion 122 and at least one wavelength conversion portion. In the present embodiment, the wavelength conversion portion includes a wavelength conversion portion 121 and a wavelength conversion portion 123 configured to convert different wavelengths, where the wavelength conversion portion 121 and the wavelength conversion portion 123 are respectively configured to convert a part of the beam BL into wavelength conversion beams R and G, and the reflecting portion 122 reflects a part of the beam BL. For example, the wavelength conversion portions 121 and 123 respectively include a fluorescent powder layer, where colors of the fluorescent powder layers included in the wavelength conversion portions 121 and 123 are respectively red color and green color. In this way, when the wavelength conversion portions 121 and 123 are sequentially cut into the transmission path of the beam BL, the beam BL is sequentially converted into the red and green wavelength conversion beams R and G. On the other hand, in the present embodiment, the wavelength conversion module 120 has a reflective film RF on a surface facing back to the light transmitting module 140, and when the beam BL is incident to the reflecting portion 122, the light beam BL is reflected by the reflecting portion 122. Moreover, the reflecting portion 122 may have a transparent layer, and when the beam BL is incident to the reflecting portion 122, the reflective film RF can directly reflect the beam BL.

In detail, referring to FIG. 1 again, after the beam BL is incident to the wavelength conversion module 120 through the light transmitting module 140, the reflecting portion 122 and the at least one wavelength conversion portions 121 and 123 are cut into the transmission path of the beam BL in turn. In detail, when the wavelength conversion portions 121 and 123 are cut into the transmission path of the beam BL, a part of the beam BL is converted into the wavelength conversion beams R and G by the at least one wavelength conversion portions 121 and 123. When the reflecting portion 122 is cut into the transmission path of the beam BL, the beam BL is reflected by the reflecting portion 122. Moreover, the wavelength conversion beams R and G and the beam BL can be correspondingly transmitted to the splitting portion 131 and the wavelength reflecting portion 133 of the light combining unit 130 through the light transmitting module 140, which is described in detail below with reference of FIG. 3.

Figure 3:
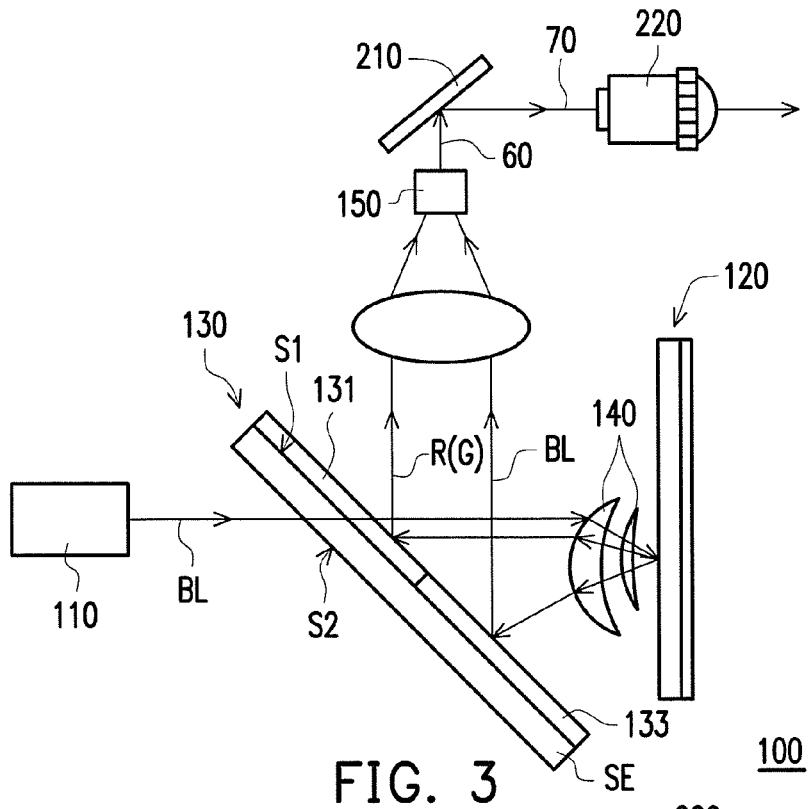
FIG. 3 is a schematic diagram of an optical path of a beam passing through a light combining unit of FIG. 1.

FIG. 3 is a schematic diagram of an optical path of a beam passing through a light combining unit of FIG. 1. Further, as shown in FIG. 1 and FIG. 3, in the present embodiment, the light combining unit 130 has a substrate SE, and the substrate SE has two surfaces S1 and S2 opposite to each other, and the splitting portion 131 and the wavelength reflecting portion 133 are located on the first surface S1. In detail, in the present embodiment, as shown in FIG. 1, the light combining unit 130 has a normal line N2, the light transmitting module 140 has an optical axis O, and an included angle $\alpha$ is formed between the normal line N2 and the optical axis O, and the included angle $\alpha$ ranges between 40 degree and 50 degree. In this way, by using the concave-convex lenses 141 and 143 with suitable dioptres, the wavelength conversion beams R and G and the beam BL can be correspondingly transmitted to the splitting portion 131 and the wavelength reflecting portion 133 of the light combining unit 130 through the light transmitting module 140. It should be noticed that the aforementioned value range is only used as an example, and the invention is not limited thereto.

Further, after a part of the beam BL is reflected by the reflecting portion 122 of the wavelength conversion module 120, the part of the beam BL is transmitted to the wavelength reflecting portion 133 of the light combining unit 130 through the light transmitting module 140. Moreover, since the wavelength reflecting portion 133 can reflect the blue-ray beam, the beam BL is reflected to the integration rod 150. On the other hand, the light combining unit 130 is also located on the transmission path of the wavelength conversion beams R and G, and since the splitting portion 131 can reflect the beams of the other wavelengths (for example, the red beam, the green beam, the yellow beam, etc.), the wavelength conversion beams R and G transmitted to the splitting portion 131 are also transmitted to the integration rod 150 after reflected by the splitting portion 131, such that the wavelength conversion beams R and G and the beam BL are combined to form the illumination beam 60.

In this way, by configuring the splitting portion 131 and the wavelength reflecting portion 133 of the light combining unit 130, the part of the beam BL reflected by the wavelength conversion module 120 and the wavelength conversion beams R and G are combined into the illumination beam 60 through the light combining unit 130. Therefore, there is no additionally designing other optical elements or beam transmission paths required, so as to reduce a volume of the whole optical path.

It should be noticed that although a situation that the splitting portion 131 and the wavelength reflecting portion of the light combining unit 130 are located on the surface S1 is taken as an example for description, the invention is not limited thereto. In other embodiments, the light combining unit 130 may have other pattern variations, which are further described below with reference of FIG. 4 and FIG. 5.

Figure 4:
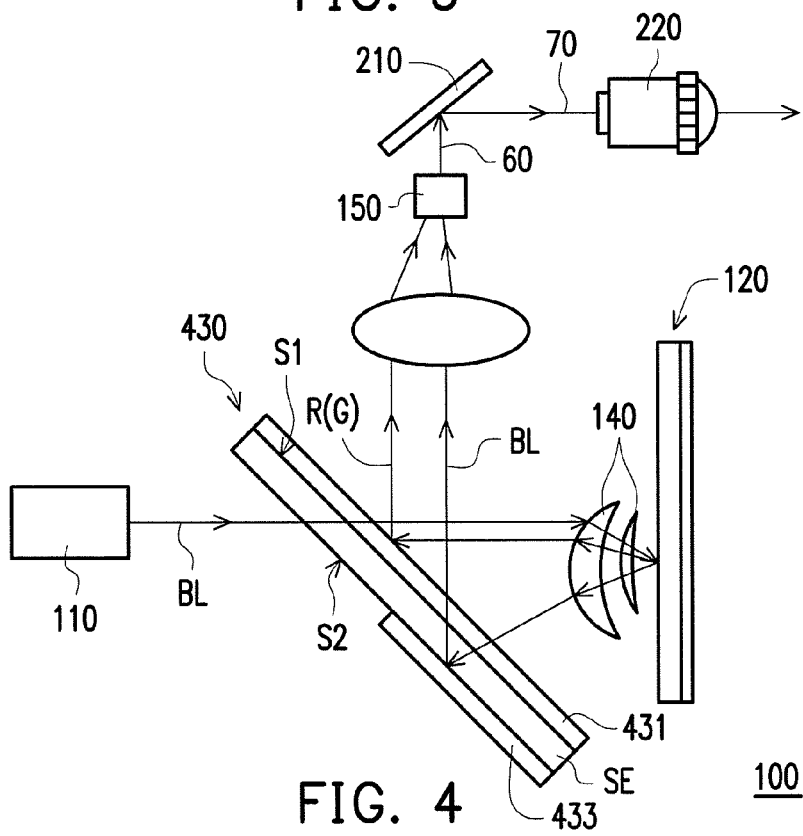
FIG. 4 is a schematic diagram of an optical path of a beam passing through another light combining unit of FIG. 1.

FIG. 4 is a schematic diagram of an optical path of a beam passing through another light combining unit of FIG. 1. Referring to FIG. 4, the light combining unit 430 of FIG. 4 is similar to the light combining unit 130 of FIG. 3, and differences there between are described as follows. In the present embodiment, the light combining unit 430 has a substrate SE, and the substrate SE has two surfaces S1 and S2 opposite to each other, and the splitting portion 431 and the wavelength reflecting portion 433 are respectively located on the two surfaces S1 and S2. When a part of the beam BL is converted into the wavelength conversion beams R and G by the at least one wavelength conversion portions 121 and 123, and a part of the beam BL is reflected by the reflecting portion 122, the wavelength conversion beams R and G and the part of beam BL can be correspondingly transmitted to the splitting portion 431 and the wavelength reflecting portion 433 of the light combining unit 430 through the light transmitting module 140, and are respectively transmitted to the integration rod 150. In this way, by configuring the splitting portion 431 and the wavelength reflecting portion 433 of the light combining unit 430, the part of the beam BL reflected by the wavelength conversion module 120 and the wavelength conversion beams R and G are combined into the illumination beam 60 through the light combining unit 430. Therefore, there is no additionally designing other optical elements or beam transmission paths required, so as to reduce a volume of the whole optical path. In this way, the light source module 100 and the projection apparatus 200 achieve the aforementioned functions and effects, which are not repeated.

Figure 5:
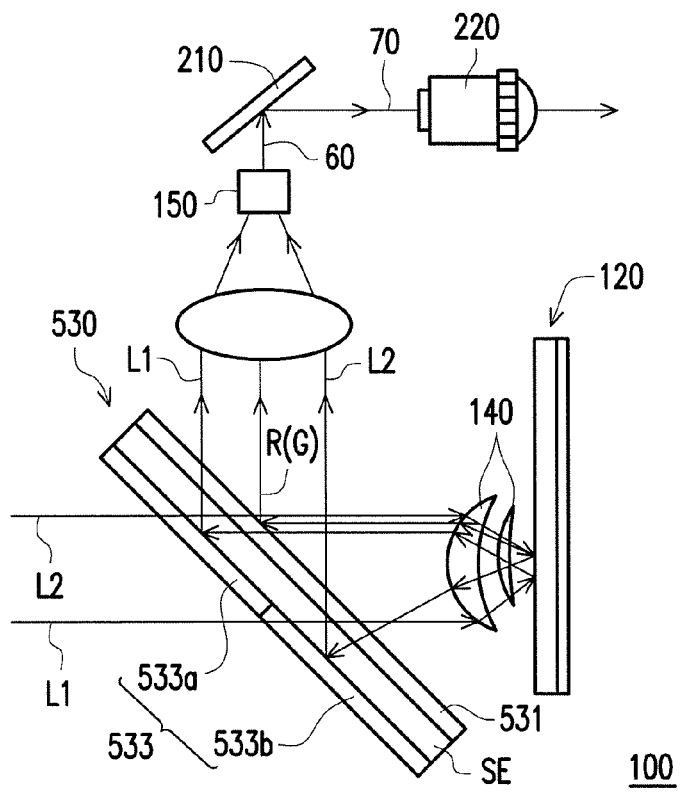
FIG. 5 is a schematic diagram of an optical path of a beam passing through still another light combining unit of FIG. 1.

FIG. 5 is a schematic diagram of an optical path of a beam passing through still another light combining unit of FIG. 1. Referring to FIG. 5, the light combining unit 530 of FIG. 5 is similar to the light combining unit 430 of FIG. 4, and differences there between are described as follows. In the present embodiment, the wavelength reflecting portion 533 includes a first wavelength reflecting portion 533a and a second wavelength reflecting portion 533b, which are configured to reflect beams of specific wavelengths. For example, in the present embodiment, the beam BL includes a first sub beam L1 and a second sub beam L2, where wavelengths of the first sub beam L1 and the second sub beam L2 are different. The first wavelength reflecting portion 533a is pervious to the second sub beam L2 and reflects the first sub beam L1. The second wavelength reflecting portion 533b is pervious to the first sub beam L1 and reflects the second sub beam L2.

In detail, as shown in FIG. 5, when the first sub beam L1 is transmitted to the wavelength reflecting portion 533, a part of the first sub beam L1 passes through the second wavelength reflecting portion 533b, and is further reflected by the wavelength conversion module 120 and transmitted to the first wavelength reflecting portion 533a. Then, the part of the first sub beam L1 is reflected to the integration rod 150 by the first wavelength reflecting portion 533a. On the other hand, when the second sub beam L2 is transmitted to the wavelength reflecting portion 533, a part of the second sub beam L2 passes through the first wavelength reflecting portion 533a, and is further reflected by the wavelength conversion module 120 and transmitted to the second wavelength reflecting portion 533b. Then, the part of the second sub beam L2 is reflected to the integration rod 150 by the second wavelength reflecting portion 533b. The wavelength conversion beams R and G can be transmitted to the splitting portion 531 of the light combining unit 530 through the light transmitting module 140, and are transmitted to the integration rod 150. Therefore, the first sub beam L1, the second sub beam L2 and the wavelength conversion beams R and G can be combined into the illumination beam 60.

In this way, by configuring the splitting portion 531 and the wavelength reflecting portion 533 of the light combining unit 530, the part of the beam BL reflected by the wavelength conversion module 120 and the wavelength conversion beams R and G are combined into the illumination beam 60 through the light combining unit 530. Therefore, there is no additionally designing other optical elements or beam transmission paths required, so as to reduce a volume of the whole optical path. In this way, the light source module 100 and the projection apparatus 200 achieve the aforementioned functions and effects, which are not repeated.

In other words, according to the aforementioned embodiment, it is known that configuration modes or forms of the splitting portions or the wavelength conversion portions of the light combining units 130, 430 and 530 are not limited by the invention, and the number of the corresponding wavelengths or distribution areas are not limited by the invention either. Any device having a valid region capable of selectively providing the pervious function or the reflective function for the beam BL and a valid region capable of providing the reflective function for the wavelength conversion beam R and G can be used as the light combining unit of the invention.

On the other hand, it should be noticed that although a situation that the wavelength conversion module 120 has the at least one wavelength conversion portions 121 and 123 and the reflecting portion 122 is taken as an example for description, the invention is not limited thereto. In other embodiments, the wavelength conversion module 120 may have other pattern variations, which is further described below with reference of FIG. 6A and FIG. 6B.

Figures 6A, 6B:
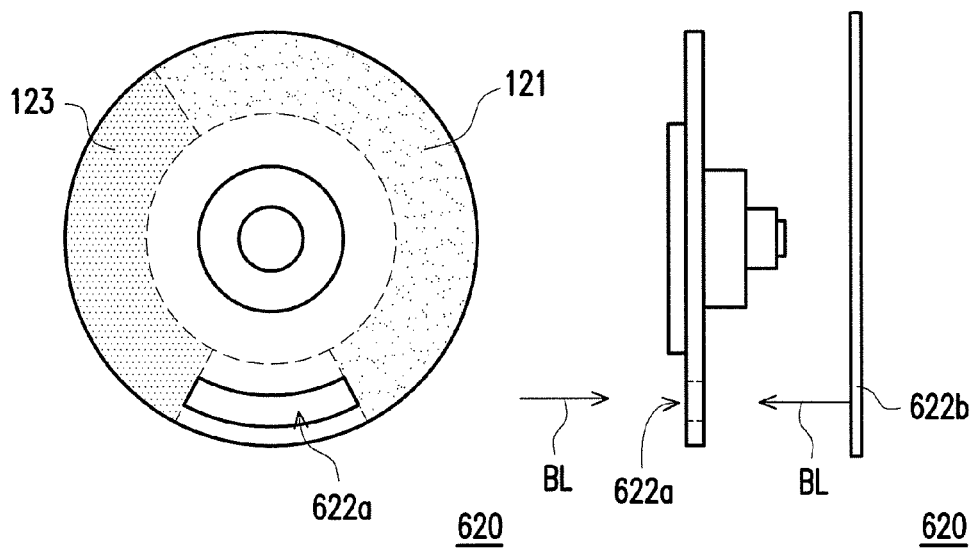
FIG. 6A is a front view of another wavelength conversion module of FIG. 1.
FIG. 6B is a side view of the wavelength conversion module of FIG. 6A.

FIG. 6A is a front view of another wavelength conversion module of FIG. 1. FIG. 6B is a side view of the wavelength conversion module of FIG. 6A. Referring to FIG. 6A and FIG. 6B, the wavelength conversion module 620 of FIG. 6A and FIG. 6B is similar to the wavelength conversion module 120 of FIG. 2B, and differences there between are as follows. In the present embodiment, the wavelength conversion module 120 includes a passing through portion 622a, at least one wavelength conversion portions 121 and 123 and a reflecting unit 622b, where the passing through portion 622a and the at least one wavelength conversion portions 121 and 123 are cut into the transmission path of the beam BL in turn. In detail, in the present embodiment, when the passing through portion 622a is cut into the transmission path of the beam BL, the beam BL passes through the passing through portion 622a, and is reflected by the reflecting unit 622b and is transmitted to the light combining unit 130. In other words, in the present embodiment the passing through portion 622a and the reflecting unit 622b are used in collaboration to achieve a function similar to that of the reflecting portion 122 of FIG. 2B, such that the wavelength conversion module 620 may achieve a function similar to that of the wavelength conversion module of FIG. 2B, and the light source module 100 and the projection apparatus 200 achieve the aforementioned functions and effects, which are not repeated.

In summary, in the light source module and the projection apparatus of the invention, by configuring the splitting portion and the wavelength reflecting portion, a part of beam reflected by the wavelength conversion module and the wavelength conversion beams are combined into the illumination beam by the light combining unit. Therefore, there is no additionally designing other optical elements or beam transmission paths required, so as to reduce a volume of the whole optical path.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. Moreover, the abstract and the name of the invention are only used to assist patent searching. Moreover, "first," "second," etc. mentioned in the specification and the claims are merely used to name the elements and should not be regarded as limiting the upper or lower bound of the number of the components/devices.

What is claimed is:

1. A light source module, comprising:
    a light source, configured to provide a beam;
    a wavelength conversion module, configured to convert a part of the beam into a wavelength conversion beam and reflect a part of the beam; and
    a light combining unit, disposed between the light source and the wavelength conversion module, located on transmission paths of the beam and the wavelength conversion beam, and comprising:
        a splitting portion, wherein the beam emitted by the light source is transmitted to the wavelength conversion module after passing through the splitting portion, the wavelength conversion beam converted by the wavelength conversion module is transmitted to the splitting portion, and the splitting portion reflects the wavelength conversion beam; and
        a wavelength reflecting portion, wherein a part of the beam is transmitted to the wavelength reflecting portion after being reflected by the wavelength conversion module, the wavelength reflecting portion reflects only the part of the beam reflected by the wavelength conversion module and transmitted to the wavelength reflecting portion, such that the part of the beam reflected by the wavelength reflecting portion and the wavelength conversion beam reflected by the splitting portion are combined to form an illumination beam.

2. The light source module as claimed in claim 1, wherein the light combining unit has two surfaces opposite to each other, and the splitting portion and the wavelength reflecting portion are respectively located on the two surfaces.

3. The light source module as claimed in claim 2, wherein the beam comprises a first sub beam and a second sub beam, wavelengths of the first sub beam and the second sub beam are different, and the wavelength reflecting portion comprises:
    a first wavelength reflecting portion, pervious to the second sub beam, and reflecting the first sub beam; and
    a second wavelength reflecting portion, pervious to the first sub beam, and reflecting the second sub beam, wherein a part of the first sub beam passing through the second wavelength reflecting portion is transmitted to the first wavelength reflecting portion after reflected by the wavelength conversion module, and a part of the second sub beam passing through the first wavelength reflecting portion is transmitted to the second wavelength reflecting portion after reflected by the wavelength conversion module.

4. The light source module as claimed in claim 1, wherein the light combining unit has two surfaces opposite to each other, and the splitting portion and the wavelength reflecting portion are located on one of the two surfaces.

5. The light source module as claimed in claim 1, wherein the wavelength conversion module comprises:
    a reflecting portion; and
    at least one wavelength conversion portion, wherein the reflecting portion and the at least one wavelength conversion portion are cut into the transmission path of the beam in turn, a part of the beam is converted into the wavelength conversion beam by the at least one wavelength conversion portion when the wavelength conversion portion is cut into the transmission path of the beam, and the beam is reflected by the reflecting portion when the reflecting portion is cut into the transmission path of the beam.

6. The light source module as claimed in claim 5, wherein the at least one wavelength conversion portion has a plurality of wavelength conversion portions, and the wavelength conversion portions are cut into the transmission path of the beam in turn, and colors of the wavelength conversion beams formed by the wavelength conversion portions respectively converting and reflecting the beam are at least partially different.

7. The light source module as claimed in claim 1, wherein the wavelength conversion module comprises:
    a passing through portion;
    at least one wavelength conversion portion, wherein the passing through portion and the at least one wavelength conversion portion are cut into the transmission path of the beam in turn, and a part of the beam is converted into the wavelength conversion beam by the at least one wavelength conversion portion when the wavelength conversion portion is cut into the transmission path of the beam; and
    a reflecting unit, wherein when the passing through portion is cut into the transmission path of the beam, the beam passes through the passing through portion, and is reflected by the reflecting unit and transmitted to the light combining unit.

8. The light source module as claimed in claim 7, wherein the at least one wavelength conversion portion has a plurality of wavelength conversion portions, and the wavelength conversion portions are cut into the transmission path of the beam in turn, and colors of the wavelength conversion beams formed by the wavelength conversion portions respectively converting and reflecting the beam are at least partially different.

9. The light source module as claimed in claim 1, further comprising:
    a light transmitting module, wherein the beam is incident to the wavelength conversion module through the light transmitting module, and a part of the beam is transmitted to the wavelength reflecting portion through the light transmitting module after the part of the beam is reflected by the wavelength conversion module.

10. The light source module as claimed in claim 9, wherein the beam is incident to the wavelength conversion module through the light transmitting module by an angle, and the angle ranges between 0 degree and 55 degree.

11. The light source module as claimed in claim 9, wherein the light combining unit has a normal line, the light transmitting module has an optical axis, an included angle is formed between the normal line and the optical axis, and the included angle ranges between 40 degrees and 50 degrees.

12. The light source module as claimed in claim 1, wherein the light source is a laser exciting light source, and the beam is a laser exciting beam.

13. A projection apparatus, comprising:
a light source module, comprising:
   a light source, configured to provide a beam;
   a wavelength conversion module, configured to convert a part of the beam into a wavelength conversion beam and reflect a part of the beam; and
   a light combining unit, disposed between the light source and the wavelength conversion module, located on transmission paths of the beam and the wavelength conversion beam, and comprising:
      a splitting portion, wherein the beam emitted by the light source is transmitted to the wavelength conversion module after passing through the splitting portion, the wavelength conversion beam converted by the wavelength conversion module is transmitted to the splitting portion, and the splitting portion reflects the wavelength conversion beam; and
      a wavelength reflecting portion, wherein a part of the beam is transmitted to the wavelength reflecting portion after being reflected by the wavelength conversion module, the wavelength reflecting portion reflects only the part of the beam reflected by the wavelength conversion module and transmitted to the wavelength reflecting portion, such that the part of the beam reflected by the wavelength reflecting portion and the wavelength conversion beam reflected by the splitting portion are combined to form an illumination beam;
a light valve, disposed on a transmission path of the illumination beam, and configured to convert the illumination beam into an image beam; and
a projection lens, disposed on a transmission path of the image beam.

14. The projection apparatus as claimed in claim 13, wherein the light combining unit has two surfaces opposite to each other, and the splitting portion and the wavelength reflecting portion are respectively located on the two surfaces.

15. The projection apparatus as claimed in claim 14, wherein the beam comprises a first sub beam and a second sub beam, wavelengths of the first sub beam and the second sub beam are different, and the wavelength reflecting portion comprises:
a first wavelength reflecting portion, pervious to the second sub beam, and reflecting the first sub beam; and
a second wavelength reflecting portion, pervious to the first sub beam, and reflecting the second sub beam, wherein a part of the first sub beam passing through the second wavelength reflecting portion is transmitted to the first wavelength reflecting portion after reflected by the wavelength conversion module, and a part of the second sub beam passing through the first wavelength reflecting portion is transmitted to the second wavelength reflecting portion after reflected by the wavelength conversion module.

16. The projection apparatus as claimed in claim 13, wherein the light combining unit has two surfaces opposite to each other, and the splitting portion and the wavelength reflecting portion are located on one of the two surfaces.

17. The projection apparatus as claimed in claim 13, wherein the wavelength conversion module comprises:
a reflecting portion; and
at least one wavelength conversion portion, wherein the reflecting portion and the at least one wavelength conversion portion are cut into the transmission path of the beam in turn, and a part of the beam is converted into the wavelength conversion beam by the at least one wavelength conversion portion when the wavelength conversion portion is cut into the transmission path of the beam, and the beam is reflected by the reflecting portion when the reflecting portion is cut into the transmission path of the beam.

18. The projection apparatus as claimed in claim 17, wherein the at least one wavelength conversion portion has a plurality of wavelength conversion portions, and the wavelength conversion portions are cut into the transmission path of the beam in turn, and colors of the wavelength conversion beams formed by the wavelength conversion portions respectively converting and reflecting the beam are at least partially different.

19. The projection apparatus as claimed in claim 13, wherein the wavelength conversion module comprises:
a passing through portion;
at least one wavelength conversion portion, wherein the passing through portion and the at least one wavelength conversion portion are cut into the transmission path of the beam in turn, and a part of the beam is converted into the wavelength conversion beam by the at least one wavelength conversion portion when the wavelength conversion portion is cut into the transmission path of the beam; and
a reflecting unit, wherein when the passing through portion is cut into the transmission path of the beam, the beam passes through the passing through portion, and is reflected by the reflecting unit and transmitted to the light combining unit.

20. The projection apparatus as claimed in claim 19, wherein the at least one wavelength conversion portion has a plurality of wavelength conversion portions, and the wavelength conversion portions are cut into the transmission path of the beam in turn, and colors of the wavelength conversion beams formed by the wavelength conversion portions respectively converting and reflecting the beam are at least partially different.

21. The projection apparatus as claimed in claim 13, wherein the light source module further comprises a light transmitting module, wherein the beam is incident to the wavelength conversion module through the light transmitting module, and a part of the beam is transmitted to the wavelength reflecting portion through the light transmitting module after the part of the beam is reflected by the wavelength conversion module.

22. The projection apparatus as claimed in claim 21, wherein the beam is incident to the wavelength conversion module through the light transmitting module by an angle, and the angle ranges between 0 degree and 55 degree.

23. The projection apparatus as claimed in claim 21, wherein the light combining unit has a normal line, the light transmitting module has an optical axis, an included angle is formed between the normal line and the optical axis, and the included angle ranges between 40 degrees and 50 degrees.

24. The projection apparatus as claimed in claim 13, wherein the light source is a laser exciting light source, and the beam is a laser exciting beam.

\* \* \* \* \*